US008736100B2

(12) United States Patent
Ueki et al.

(10) Patent No.: US 8,736,100 B2
(45) Date of Patent: May 27, 2014

(54) SHIP

(75) Inventors: Shuji Ueki, Tokyo (JP); Tetsuro Kajita, Tokyo (JP)

(73) Assignee: Mitsui Engineering & Ship Building Co., Ltd., Tokyo (JP)

( * ) Notice: Subject to any disclaimer, the term of this patent is extended or adjusted under 35 U.S.C. 154(b) by 0 days.

(21) Appl. No.: 14/110,628

(22) PCT Filed: Dec. 9, 2011

(86) PCT No.: PCT/JP2011/078528
§ 371 (c)(1),
(2), (4) Date: Oct. 8, 2013

(87) PCT Pub. No.: WO2013/057847
PCT Pub. Date: Apr. 25, 2013

(65) Prior Publication Data
US 2014/0028090 A1    Jan. 30, 2014

(30) Foreign Application Priority Data

Oct. 21, 2011  (JP) ................................ 2011-232098

(51) Int. Cl.
*B60L 3/00* (2006.01)
(52) U.S. Cl.
USPC .......................................... 307/9.1; 307/10.1
(58) Field of Classification Search
CPC ........ B63H 21/22; B63H 23/00; B63H 21/17; B63J 99/00; B63B 35/00; H02J 3/46
USPC .................................................. 307/9.1, 10.1
See application file for complete search history.

(56) References Cited

U.S. PATENT DOCUMENTS

| 2005/0287880 | A1* | 12/2005 | Okuyama | 440/1 |
| 2009/0156068 | A1* | 6/2009 | Barrett et al. | 440/3 |
| 2009/0302152 | A1* | 12/2009 | Knight | 244/58 |
| 2010/0218710 | A1* | 9/2010 | Feger | 114/26 |

FOREIGN PATENT DOCUMENTS

| JP | 2006-14524 A | 1/2006 |
| JP | 2008-24187 A | 2/2008 |
| JP | 2009-67302 A | 4/2009 |

(Continued)

OTHER PUBLICATIONS

International Search Report dated Mar. 19, 2012, issued in corresponding application No. PCT/JP2011/078528.

*Primary Examiner* — Rexford Barnie
*Assistant Examiner* — Joseph Inge
(74) *Attorney, Agent, or Firm* — Westerman, Hattori, Daniels & Adrian, LLP

(57) ABSTRACT

A ship that reduces the total amount of fossil fuels and other energy sources required, thereby saving energy. The ship (1) has a plurality of subsystems (10) constructed by dividing a network of power supply lines (3) and signal lines (4) into groups. The subsystems (10) consist of at least two subsystems among a bridge subsystem (10a) on the bridge; a propulsion subsystem (10b) in an engine room; a deck subsystem (10c) installed on a deck; a ballast cargo subsystem (10d) for ballasting and equipment installed in a hold; and an information processing subsystem (10e) corresponding to communication equipment. The subsystems (10) each have a storage battery (5) and a smart meter (6), each of which is linked to a microgrid monitoring and control system (2), which detects the amount of electric power consumed by the subsystems (10), and controls the transfer of electric power between the subsystems.

6 Claims, 1 Drawing Sheet

(56) References Cited

FOREIGN PATENT DOCUMENTS

| | | |
|---|---|---|
| JP | 2009-161032 A | 7/2009 |
| JP | 2010-115009 A | 5/2010 |
| JP | 2011-20620 A | 2/2011 |
| JP | 2011-61931 A | 3/2011 |
| WO | 2011/030472 A1 | 3/2011 |

* cited by examiner

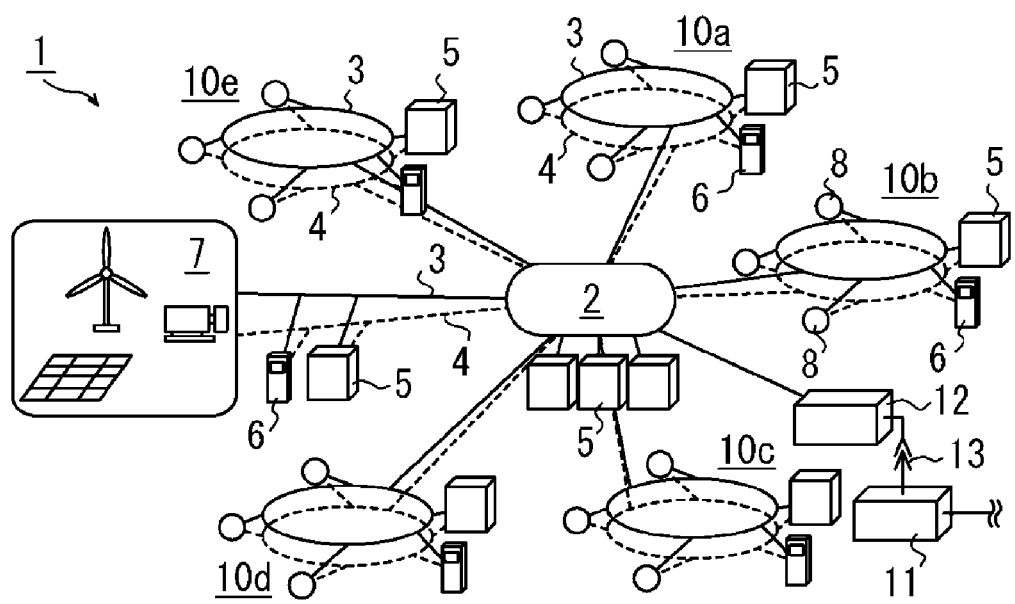

SHIP

TECHNICAL FIELD

The present invention relates to a ship achieving energy saving and reduction in the amount of fuel consumption.

BACKGROUND ART

Heretofore, ships such as bulk carriers and tankers include a large-sized diesel engine (main engine) to obtain propulsive power and a middle-sized diesel engine (auxiliary engine) as an electric generator to generate electric power for onboard electric power sources and the like. In recent years, there has been a demand for these types of ships to achieve energy saving and reduction in the amount of fuel consumption in view of problems such as the rising price of fossil fuel and the emission control. For example, a method is disclosed in which when a ship is berthing at a quay for cargo handling, regenerative energy of a crane performing cargo handling at the dock or the like is supplied as the ship's onboard electric power (see Patent Document 1, for example). This configuration allows the ship to reduce the amount of fuel consumption by an electric generator and the like during berthing.

Moreover, a method is disclosed in which a ship receives electricity as its onboard electric power from a land power supplying facility through a land power receiving facility installed on the ship (see Patent Document 2, for example). In this case, these facilities can cover the whole electric power required by the ship during berthing.

However, the ship described above has a problem of requiring the same amount of energy (such as fossil fuel) as conventional cases during navigation. That is, improvement is yet to be made to the amount of exhaust emission, the amount of fossil fuel consumption, and the like while the ship is on the ocean.

PRIOR ART DOCUMENTS

Patent Documents

Patent Document 1: Japanese patent application Kokai publication No. 2010-115009
Patent Document 2: Japanese patent application Kokai publication No. 2009-67302

SUMMARY OF THE INVENTION

Problem to be Solved by the Invention

The present invention has been made in view of the problem described above, and an object thereof is to provide a ship that reduces the total amount of energy such as fossil fuel required by the entire ship not only during berthing but during navigation, thereby achieving energy saving.

Means for Solving the Problem

A ship according to the present invention for achieving the above-described object is a ship, characterized in that: the ship comprises a plurality of subsystems constructed by dividing a network of power supply lines and a network of signal lines for transmitting information into a plurality of groups; the plurality of subsystems include at least two of a bridge subsystem for equipment of a bridge, a propulsion subsystem for propulsion equipment in an engine room, a deck subsystem for equipment installed on a deck, a ballast cargo subsystem for equipment for ballast operation and equipment installed in a hold, and an information processing subsystem for communication equipment; the plurality of subsystems each have a storage battery and a smart meter, and are each linked to a microgrid monitoring and control system; and the microgrid monitoring and control system is configured to detect an amount of electric power consumed by the plurality of subsystems and control transfer of electric power between the subsystems.

This configuration can eliminate the supply-demand gaps of electric power among the subsystems and therefore level the amounts of electric power consumption. Accordingly, the amount of electric power consumption of the whole ship can be reduced, and energy saving can therefore be achieved.

The above-described ship is characterized in that an electric generator is connected to the microgrid monitoring and control system. This configuration makes it possible to achieve diversification of the electric generator and realize a distributed electric power source. Accordingly, it is possible to diversify the risk of a power failure by an accident or the like, for example.

The above-described ship is characterized in that the electric generator is at least one of a photovoltaic generator, a wind generator, a fuel cell, a diesel generator, a power turbine generator, a turbo generator, and a shaft generator. This configuration can further reduce the risk of a power failure. This is because electricity generated by the electric generator can be stored in the batteries installed in the subsystems.

The above-described ship is characterized in that the microgrid monitoring and control system is configured to, while the ship is berthing at a quay, receive electric power from a land power supplying facility installed on the quay through a land power receiving facility installed on the ship and supply the electric power to the storage batteries. This configuration makes it possible to charge the batteries of the subsystems while the ship is berthing at a quay. Accordingly, the amount of fossil fuel or the like used by the ship can be reduced.

The above-described ship is characterized in that any one of the propulsion subsystem and the deck subsystem includes an electro-hydraulic actuator which operates equipment and an electric line through which to supply electric power to the electro-hydraulic actuator. This configuration eliminates the need for a conventional hydraulic device, hydraulic piping and hydraulic piping work. Moreover, the electro-hydraulic actuator does not need to be consistently running like a hydraulic pump. Further, the electro-hydraulic actuator can reduce the consumed energy as compared to the conventional hydraulic device because its electric motor is rotated while the actuator is movable, and the electric motor is stopped while the actuator is not movable.

The above-described ship is characterized in that the ship is an electric propulsion ship including the electric generator, the storage batteries, and a main engine configured of a motor. This configuration allows navigation of the ship without using fossil fuel. This is because it is possible to employ a free combination of various types of electric generators.

Effect of the Invention

According to the ship of the present invention, it is possible to provide a ship that reduces the total amount of energy such as fossil fuel consumed by the entire ship not only during berthing but during navigation, thereby achieving energy saving.

BRIEF DESCRIPTION OF THE DRAWING

FIG. 1 is a diagram showing the concept of a ship of an embodiment according to the present invention.

MODES FOR CARRYING OUT THE INVENTION

Hereinbelow, a ship of an embodiment according to the present invention will be described with reference to the drawing. FIG. 1 shows the concept of a ship 1 of the embodiment according to the present invention. The ship 1 includes a microgrid monitoring and control system (hereinafter, also referred to as the control system) 2 and five subsystems 10 which are a bridge subsystem 10a for equipment 8 of the bridge, a propulsion subsystem 10b for equipment 8 for propulsion in the engine room and the like, a deck subsystem 10c for equipment 8 installed on the deck, a ballast cargo subsystem 10d for equipment 8 for ballast operation and equipment 8 installed in the hold, and an information processing subsystem 10e for equipment 8 for communications (hereinafter, collectively referred to as the subsystem(s) 10).

Each of the subsystems 10 has a network of power supply lines 3 and a network of signal lines 4. A storage battery 5, a smart meter 6, and various kinds of equipment 8 are connected to the network of power supply lines 3 and the network of signal lines 4. The storage battery 5 is connected to each subsystem 10 and is configured to supply electric power to the equipment 8 in the corresponding subsystem 10. Moreover, the smart meter 6 is configured of an electricity meter having a data communication function. Thus, the smart meter 6 is capable of measuring in real time the amount of electric power used by the corresponding subsystem 10 and sending it to the control system 2.

Here, multiple batteries 5 may be connected to the control system 2. Moreover, the control system 2 may be configured to, while the ship 1 is berthing, receive electricity supplied from a land power supplying facility 11 installed on a quay through a land power receiving facility 12 installed on the ship. Note that reference numeral 13 denotes a connector to connect power cables.

Next, each subsystem will be described. First, in the bridge subsystem 10a, besides the storage battery 5 and the smart meter 6, a cockpit console, a ballast cargo console, a deck equipment console, various sensors, and the like, for example, are connected as the equipment 8 to the network of power supply lines 3 and the network of signal lines 4. In other words, the bridge subsystem 10a is constructed mainly for devices that are usually placed on the bridge.

In the propulsion subsystem 10b, an electric propulsion system, an auxiliary propulsion system, a steering system, and the like are connected as the equipment 8 to the network of power supply lines 3 and the network of signal lines 4. In other words, the propulsion subsystem 10b is constructed mainly for devices that are usually placed in the engine room. Meanwhile, in the case of a ship equipped with a diesel engine instead of an electric propulsion system as in conventional cases, a control unit for the diesel engine or the like is connected as the equipment 8.

Likewise, in the deck subsystem 10c, a deck crane, a windlass, a winch, and the like are connected as the equipment 8 to the network of power supply lines 3 and the network of signal lines 4. Moreover, in the ballast cargo subsystem 10d, a hatch cover opening-closing device, a ballast pump, a ballast water treatment system, and the like are connected as the equipment 8 to the network of power supply lines 3 and the network of signal lines 4. Furthermore, in the information processing subsystem 10e, a communication antenna device, air conditioning, lights, personal computers, the electric power sources of living quarters, and the like are connected to as the equipment 8 to the network of power supply lines 3 and the network of signal lines 4.

The ship 1 further includes an electric generator 7 connected to the control system 2. A storage battery 5 and a smart meter 6 are desirably connected to the electric generator 7 as in the subsystems 10. Here, the electric generator 7 can be configured of at least one of a solar panel for photovoltaic power generation (photovoltaic generator), a wind turbine for wind power generation (wind generator), a fuel cell, a diesel generator, an exhaust-gas exhaust-heat recovery type generator (power turbine generator, turbo generator, etc.), a shaft generator, and the like.

Next, power supply control in the ship 1 will be described. First, from the smart meter 6 of each subsystem 10, the microgrid monitoring and control system 2 collects and accumulates information on the remaining capacity of the storage battery 5 connected to the subsystem 10 and the amount of electricity used by the equipment 8. Based on this information, the microgrid monitoring and control system 2 performs control so that electric power interchange is done among the multiple subsystems 10. This control by the control system 2 may be designed such that the multiple subsystems 10 are weighted by means of a program, for example, to thereby determine to which of the subsystems 10 to supply electric power in priority. Here, a program may be constructed such that the subsystem(s) 10 to supply electric power to in priority can be changed based on the status of the ship 1 such as whether the ship 1 is navigating or berthing, for example. Alternatively, a physical electric circuit may be utilized to detect and level the voltage differences among the subsystems 10 by means of an inverter or the like.

Meanwhile, the control system 2 can also collect and accumulate information on the remaining capacity of the storage battery 5 of the electric generator 7 and the amount of electric power generation in real time from the smart meter 6 thereof, and perform control based on this information to supply electric power to each subsystem 10 from the electric generator 7 or its storage battery 5. Moreover, when the ship 1 is berthing, the control system 2 can also perform control based on the above information to supply electric power to each subsystem 10 from the land power supplying facility 11 installed on a quay through the land power receiving facility 12 installed on the ship.

The configuration described above can provide the following operations and effects. Firstly, the configuration involving installing the microgrid monitoring and control system 2 can eliminate the supply-demand gaps of electric power among the subsystems 10 and therefore level the amounts of electric power consumption. Accordingly, the amount of electric power consumption of the whole ship 1 can be reduced.

Secondly, the configuration involving grouping the sets of equipment 8 used on the ship 1 into the multiple subsystems 10 can make it easier for the ship 1 to employ a control method and a control program for a smart grid that has started to be used in urban areas. Accordingly, the control system 2 can be improved efficiently. It should be noted that the knowledge on the power supply control method and the like obtained regarding the ship 1 can be easily applied to smart grids for urban areas.

Thirdly, the above configuration of the ship 1 makes it possible to achieve diversification of the electric generator 7 and realize a distributed electric power source. Specifically, installing the control system 2 on the ship 1 can make it easier to add and connect electric generators 7 of different types to the networks of power supply lines 3 on the ship 1. Thus, electric power can be supplied efficiently from the electric generators 7. Accordingly, it is possible to diversify the risk of a power failure by an accident or the like, for example.

In addition to the above, the following configurations can be added to the ship 1 of the present invention. Firstly, the propulsion subsystem 10b and the deck subsystem 10c can each be configured in such a way as to include no hydraulic device and instead to include an electro-hydraulic actuator for operating the equipment 8. This configuration using no hydraulic device can reduce the amount of electric power consumption of the ship 1. This is because a hydraulic pump or the like which would consistently operate and keep consuming electric power is not used. Moreover, the configuration using no hydraulic device eliminates the need for hydraulic piping and hydraulic piping work.

For this electro-hydraulic actuator, a hydraulic pump and a servomotor having a control function are installed in an actuator instead of control valves (direction control valve, flow control valve, pressure control valve, servovalve) that are essential to conventional hydraulic systems so that the actuator can be driven directly. By controlling this servomotor's positive and negative rotations, it is possible to control advancing and retreating movement of a cylinder of the electro-hydraulic actuator. Accordingly, control can be done with higher accuracy and better energy-saving performance than conventional hydraulic systems.

Secondly, the main engine to obtain the propulsive power of the ship 1 can be changed from a large-sized diesel engine to a motor, i.e. an electric propulsion ship. This configuration allows navigation of the ship 1 using a lesser amount of fossil fuel. This is because it is possible to employ a free combination of various types of electric generators.

Thirdly, a sail that receives wind to obtain propulsive power can be installed on the ship 1, and further multiple solar cell modules can be installed on the surface of this sail as an electric generator 7. This configuration allows the ship 1 to achieve energy saving. Here, the solar cell modules can be connected to a storage battery 5 and a smart meter 6 as an electric generator 7 and also connected to the microgrid monitoring and control system 2.

Similarly, solar cell modules can be installed on the upper deck, the outer wall of the living quarters, and the like. This configuration can improve the amount of electric power generation on the ship 1 and therefore reduce the volume of the fuel tank mounted on the ship 1. In other words, the loadable amount of cargos can be increased.

Fourthly, the ship 1 can be configured to, while berthing, supply electric power to the multiple storage batteries 5 from a power supply facility such as a container terminal. This configuration can reduce the amount of fossil fuel consumed by the ship 1.

EXPLANATION OF REFERENCE NUMERALS

1 ship
2 microgrid monitoring and control system (control system)
3 network of power supply lines
4 network of signal lines
5 storage battery
6 smart meter
7 electric generator
8 equipment
10 subsystem
10a bridge subsystem
10b propulsion subsystem
10c deck subsystem
10d ballast cargo subsystem
10e information processing subsystem
11 land power supplying facility
12 land power receiving facility
13 connector

The invention claimed is:

1. A ship, characterized in that
the ship comprises:
a main engine and an auxiliary engine independently of each other, the main engine being configured to obtain propulsive power, the auxiliary engine being configured to generate electric power; and
a plurality of subsystems constructed by dividing a network of power supply lines and a network of signal lines for transmitting information into a plurality of groups,
the plurality of subsystems include at least two of a bridge subsystem for equipment of a bridge, a propulsion subsystem for propulsion equipment in an engine room, a deck subsystem for equipment installed on a deck, a ballast cargo subsystem for equipment for ballast operation and equipment installed in a hold, and an information processing subsystem for communication equipment,
the plurality of subsystems each have a storage battery and a smart meter, and are each linked to a microgrid monitoring and control system, and
the microgrid monitoring and control system is configured to weight the plurality of subsystems to determine to which of the subsystems to supply electric power in priority.

2. The ship according to claim 1, characterized in that an electric generator is connected to the microgrid monitoring and control system, and
the electric generator is at least one of a photovoltaic generator, a wind generator, a fuel cell, a diesel generator, a power turbine generator, a turbo generator, and a shaft generator.

3. The ship according to claim 1, characterized in that the microgrid monitoring and control system is configured to, while the ship is berthing at a quay, receive electric power from a land power supplying facility installed on the quay through a land power receiving facility installed on the ship and supply the electric power to the storage batteries.

4. The ship according to claim 1, characterized in that any one of the propulsion subsystem and the deck subsystem includes an electro-hydraulic actuator which operates equipment and an electric line through which to supply electric power to the electro-hydraulic actuator.

5. The ship according to claim 1, characterized in that the ship is an electric propulsion ship including the electric generator, the storage batteries, and a main engine configured of a motor.

6. The ship according to claim 2, characterized in that the microgrid monitoring and control system is configured to, while the ship is berthing at a quay, receive electric power from a land power supplying facility installed on the quay through a land power receiving facility installed on the ship and supply the electric power to the storage batteries.

* * * * *